United States Patent [19]

Loewe

[11] Patent Number: 5,009,372

[45] Date of Patent: Apr. 23, 1991

[54] ROLL CASSETTE WITH SPACERS FOR HEIGHT ADJUSTMENT

[75] Inventor: Erhard Loewe, Waldesch, Fed. Rep. of Germany

[73] Assignee: E. I. du Pont de Nemours and Company, Wilmington, Del.

[21] Appl. No.: 347,388

[22] Filed: May 1, 1989

[30] Foreign Application Priority Data

May 11, 1988 [DE] Fed. Rep. of Germany ... 8806260[U]

[51] Int. Cl.$^5$ .......................................... B65H 75/00
[52] U.S. Cl. .................................... 242/71.1; 354/275; 355/72
[58] Field of Search .................. 242/71, 71.1, 71.7, 242/55.53; 206/389, 395, 397, 407–409; 354/275; 248/188.1, 188.2, 188.8, 188.9; 355/72

[56] References Cited

U.S. PATENT DOCUMENTS

| 1,356,798 | 10/1920 | Stock | 248/188.9 |
| 2,110,005 | 3/1938 | Rees | 248/188.2 |
| 2,137,803 | 11/1938 | Hambrook | 248/188.9 |
| 2,716,533 | 8/1955 | Freeman | 248/188.1 X |
| 2,975,933 | 3/1961 | Abolins | 248/188.8 |
| 3,315,910 | 4/1967 | Galley et al. | 242/71.1 |
| 3,342,445 | 9/1967 | Bouwkamp | 248/188.9 |
| 3,401,908 | 9/1968 | Rapata | 248/188.8 |
| 3,452,663 | 7/1969 | Machtig | 248/188.2 X |
| 3,485,350 | 12/1969 | Overton, III et al. | 206/408 |
| 3,655,160 | 4/1972 | Grillot | 248/188.8 |
| 4,243,194 | 1/1981 | Moore, Jr. et al. | 248/188.1 |
| 4,842,211 | 6/1989 | Robbins | 242/71.7 X |

FOREIGN PATENT DOCUMENTS 2950624 12/1978 Fed. Rep. of Germany .......... 17/26
648602 1/1951 United Kingdom .................. 225/43

Primary Examiner—John M. Jillions

[57] ABSTRACT

The present invention relates to a light-tight roll-film cassette for holding and dispensing light sensitive material, having means to adjust the vertical position of the cassette in the exposure device, these means consisting of attachable spacers.

15 Claims, 1 Drawing Sheet

ROLL CASSETTE WITH SPACERS FOR HEIGHT ADJUSTMENT

BACKGROUND OF THE INVENTION

1. Field of the Invention

This invention relates to a cassette for a roll of web material, with an outlet slit oriented parallel to the roll axis and positioned above the bottom surface of the cassette housing.

2. Description of Related Art

Cassettes that are intended to be light-tight are known in many versions. They are used to hold rolls of photographic web materials, either film or paper, for various purposes, such as portrait photography, photo typesetting, x-ray photography and the like. The cassette housing is cylindrical or preferably cuboid with the outlet slit formed between two lips on an upper edge of the cuboid.

A type of cassette disclosed in German OS 2,950,624 has a cuboid mid-section and two side sections bonded to it.

Another known type of cassette found on the market consists of two injection-molded half shells bonded together along a juncture line running diagonally to the cuboid.

These types of cassettes are used in exposure devices, for example, PTS cameras for photo typesetting. The construction of these exposure devices requires different cassette versions.

It is believed desirable to provide a cassette useable in these different devices.

SUMMARY OF THE INVENTION

The present invention is related to a cassette with a bottom surface provided with optionally mountable spacers.

With the aid of the spacers, the height of the outlet slit over the support surface for the cassette can be varied while the distance between the bottom of the cassette and the outlet slit remains constant. By the use of spacers or the selection of spacers of different thicknesses, height adjustments can be achieved to permit the use of one and the same cassette for two or more different exposure devices. This results in significant efficiencies in production and inventory.

In an example of a preferred embodiment, the bottom of the cassette has sockets that accept insertion projections provided on the spacers. The spacers are thus held by an insertion connection. This permits easy mounting when desired.

In this arrangement, the insertion projections can be bars that engage slot-shaped sockets.

It is preferred that the insertion projections be pins that engage hole-shaped sockets.

In this instance, the axes of the pins and the sockets respectively should form an acute angle with the bottom surface of the cassette housing. This has the advantage of affording a greater hole length for the same hole diameter and same vertical spacing to the bottom surface, a feature that increases assurance against inadvertent separation.

It is advisable for the axes of the pins and the sockets to be inclined away from the outlet slit. When the cassette is under stress as the roll of web material is unwound, the cassette is held more firmly on the spacers.

It is also worthwhile that the height of the spacers be different from the width and that the insertion projections be mounted on a wide side as well as on a narrow side. Two different height adjustments can be made by rotating the spacers by 90°.

In this case, the pins mounted on the narrow side can be shaped as half cylinders. Such half cylinders can be mounted at a lower height on the narrow sides of spacers.

The spacers are applied preferably to a substantially planar bottom surface. Therefore, the spacers can be similarly planar, for example, like fillets.

This can be best accomplished if the cassette housings are essentially cuboid-shaped.

It is also desirable that the cassette housing be formed from two half shells, each provided with a lip delineating the outlet slit, the half shells being joined along a juncture line running diagonally to the cuboid shape and that the axes of the hole-shaped sockets be approximately perpendicular to the juncture line. Despite their angle of inclination, such sockets can be easily removed from the mold.

In a preferred embodiment, two blind hole sockets are provided for each spacer, the sockets being formed as indentations projecting into the interior of the housing near the edges of the cuboid. Such indentations can be provided near the edges of the cuboid without touching the cylindrical roll even when it is full. The half shells are usually removed from the mold vertically to their separation line. The orientation required for the sockets does not affect adversely this step in the molding process.

In particular, the housing section containing the bottom surface should be injection molded from synthetic resin. In this manner, the sockets can be made very clean cut, so that the desired locking effect also occurs.

It is further desirable that the insertion projections have locking ribs parallel to the axes of the projections. These locking ribs produce a secure hold in the sockets.

It has also been shown to be advantageous for the spacers in each case to be injection molded together for one cassette and to be joined together by rods. This makes for simple handling. The user is assured that he receives matched spacers.

BRIEF DESCRIPTION OF THE DRAWINGS

The invention can be more fully understood from the following detailed description thereof in connection with accompanying drawings which form a part of this application and in which.

DESCRIPTION OF THE PREFERRED EMBODIMENT(S)

Figure 1:
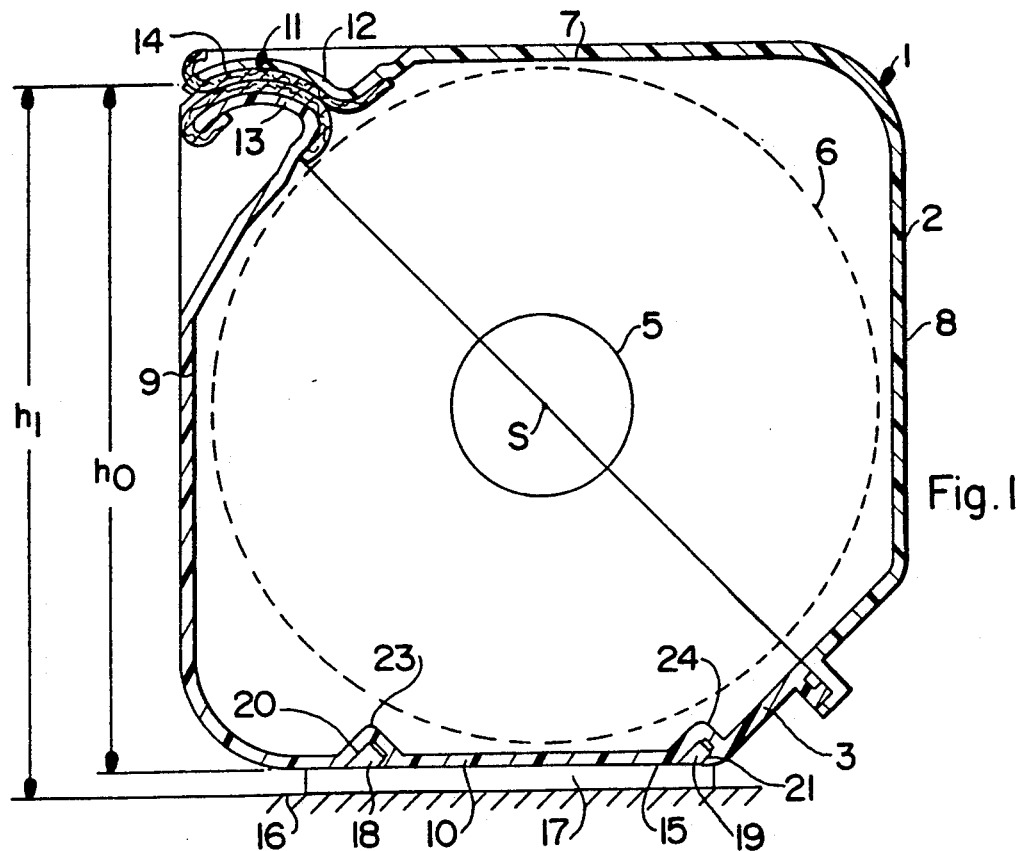
FIG. 1 is a cross-section through a cassette of the present invention.

Throughout the following detailed description, similar reference numerals refer to similar elements in all Figures of the drawings.

Referring to FIG. 1, there is illustrated a cassette having a housing 1 in accordance with the present invention. The cassette housing 1 is formed from two half shells 2, 3 joined together on three sides along a juncture line 4. Located on the side walls are bearing sockets 5 that accept a core of, or a bearing element joined with the core of, a roll 6 represented by discontinuous lines. The two half shells 2, 3 make a cuboid of four wall segments 7, 8, 9, 10 at right angles to each other joined together by curved or straight connecting segments. The juncture line 4 runs diagonally through the cuboid. In the left upper corner of a square emcompassing the cuboid is an outlet slit 11 bounded by two lips 12, 13, each formed on a half shell 2 and 3 respectively. The two lips 12, 13 are provided with linings 14 of felt, fabric or soft plastic to prevent light entry through the outlet slit 11. An outlet region of the outlet slit 11 has a predetermined height $h_o$ over a flat bottom surface 15 of the cassette housing 1.

If the configuration of the exposure device requires that a greater height $h_1$ be available between the outlet slit 11 and a plane 16 supporting the cassette, two spacers or supports 17 in the form of narrow fillets can be mounted on the bottom surface 15 spaced apart from each other in the direction of the roll axis S. See FIG. 2. Insertion pins 18, 19 on each support 17 fit into blindholes or sockets 20 and 21 respectively, which form indentations 23, 24 projecting into the interior of the cassette housing 1. The axes of the pins 18, 19 and the blind holes 20, 21 are perpendicular to the juncture line 4 and are at an acute angle, e.g., of 45°, to the bottom surface 15. For this, the half shells 2, 3 can be produced as injection molded parts, the half shell 3 being easily removed from the mold. The incline of the axes of the pins 18 and the holes 20, 21 points away from the outlet slit 11. Therefore, if the cassette is tugged to the left by the withdrawal of the web material on the roll, there is no risk of being pulled off the spacers 17.

Figure 2:
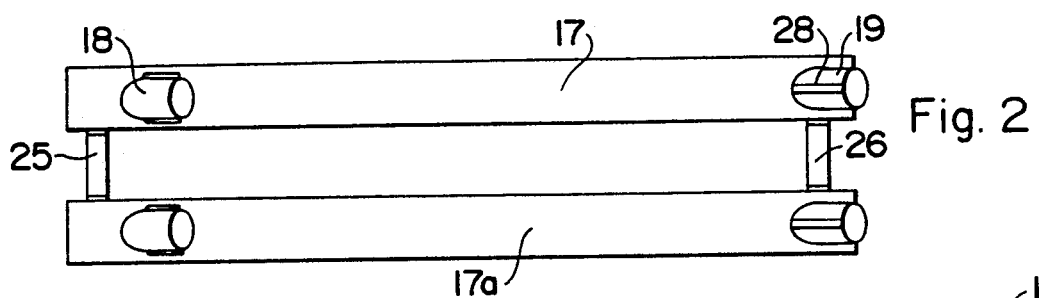
FIG. 2 is an enlarged top view of a pair of spacers.

FIG. 2 shows two spacers 17 joined together. They are connected together by rods 25, 26 and therefore are supplied together.

Figure 3:
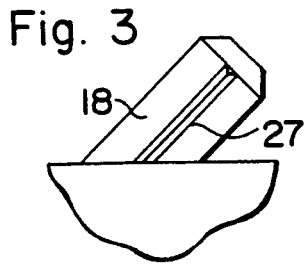
FIG. 3 is an enlarged side view representation of an insertion pin.
Figure 4:
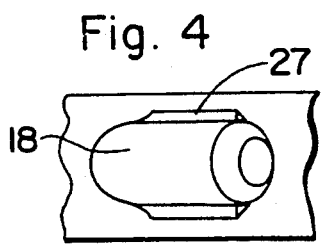
FIG. 4 is a top view of the pin of FIG. 3.

In FIGS. 3 and 4, the insertion pins 18 have locking ribs 27 on opposite sides, making for a tight socket connection. Such locking ribs 28 can be, for instance, mounted on the top and bottom sides of the insertion pins 19 or on the left and right sides of the insertion pins 19. See FIG. 2.

Figure 5:
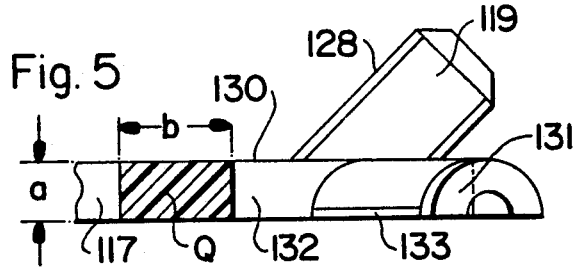
FIG. 5 is a side view of a modified embodiment.

In FIG. 5, the spacer 117 has a rectangular cross-section Q, the height a of which is less than the width b. In addition to the insertion pin 119 with a completely cylindrical shape on the wide side 130, there is an insertion pin 131 with a half-cylinder shape on the narrow side 132. The insertion pins 119, 131 have locking ribs 128 and 133 respectively. In this embodiment illustrated, the height $h_o$ of the cassette 1 is increased by a. By rotation of the support 117 through 90°, the height $h_o$ can be increased by b.

Figure 6:
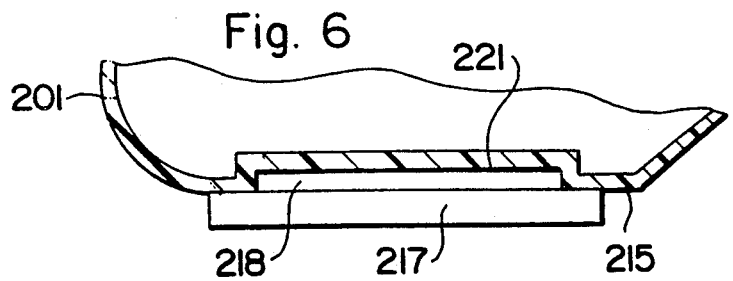
FIG. 6 is a partial cross-section through another modified embodiment.

In the embodiment according to FIG. 6, a bottom surface 215 of a cassette housing 201 is provided with a slot-shaped socket 221, into which is inserted a longitudinal bar 218 mounted on a spacer 217. This spacer 217 can also be fillet-shaped and handled like the spacers 17, 17a.

It is understood that spacers with different thicknesses can be used to accommodate other heights h with one and the same cassette.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A light-tight cassette for a roll of web material and adapted for use in at least two exposure devices having cassette support surfaces at different heights from points for receiving the material from the cassette comprising a housing defining an outlet slit oriented parallel to a rotational axis of the roll and positioned above a bottom surface of the cassette housing, characterized in that the bottom surface has means for detachably mounting to at least one spacer such that when no spacer is mounted to the bottom surface the cassette is adapted for use in one of the exposure devices and when one of the spacers is mounted to the bottom surface the cassette is adapted for use in a different one of the exposure devices.

2. The cassette in accordance with claim 1, characterized in that the mounting means comprises sockets for engaging insertion projections protruding from the spacers and the cassette comprising at least one spacer having insertion projections for engaging the sockets.

3. The cassette in accordance with claim 2, characterized in that the insertion projections are bars that are mated with slot-shaped sockets.

4. The cassette in accordance with claim 2, characterized in that the insertion projections are pins that are mated with hole-shaped sockets.

5. The cassette in accordance with claim 4, characterized in that axes of the pins and sockets respectively form an acute angle with the bottom surface.

6. The cassette in accordance with claim 5, characterized in that the axes of the pins and the sockets are inclined away from the outlet slit.

7. The cassette in accordance with claim 4, characterized in that the height (a) of the spacers is different from the width (b) and the insertion projections are mounted on a wide side as well as on a narrow side.

8. The cassette in accordance with claim 7, characterized in that the pins mounted on the narrow side are shaped like half cylinders.

9. The cassette in accordance with claim 1, characterized in that the bottom surface is substantially flat and the spacers are mounted on the substantially flat bottom surface.

10. The cassette in accordance with claim 9, characterized in that the cassette housing is substantially cuboid.

11. The cassette in accordance with claim 4, characterized in that two blind hold sockets shaped as indentations protruding into the housing interior near edges of the cuboid are provided for each spacer.

12. The cassette in accordance with claim 4, characterized in that the cassette housing is substantially cuboid and formed from two half shells, each provided with a lip delinerating the outlet slit, the two half shells being bonded together along a juncture line oriented diagonally to the cuboid and the axes of the hole-shaped sockets are approximately perpendicular to the juncture line.

13. The cassette in accordance with claim 1, characterized in that a housing section containing the bottom surface is injection-molded from synthetic resin.

14. The cassette in accordance with claim 2, characterized in that the insertion projections have locking ribs parallel to axes of the projections.

15. The cassette in accordance with claim 1, characterized in that the spacers for one cassette are injection molded together and are joined together by rods.

* * * * *